Oct. 27, 1925.

R. F. CHENEY 1,558,791

GOVERNOR

Filed Oct. 17, 1921

3 Sheets-Sheet 1

Inventor
Ray F. Cheney
By Miller Chindall Barker
Attys

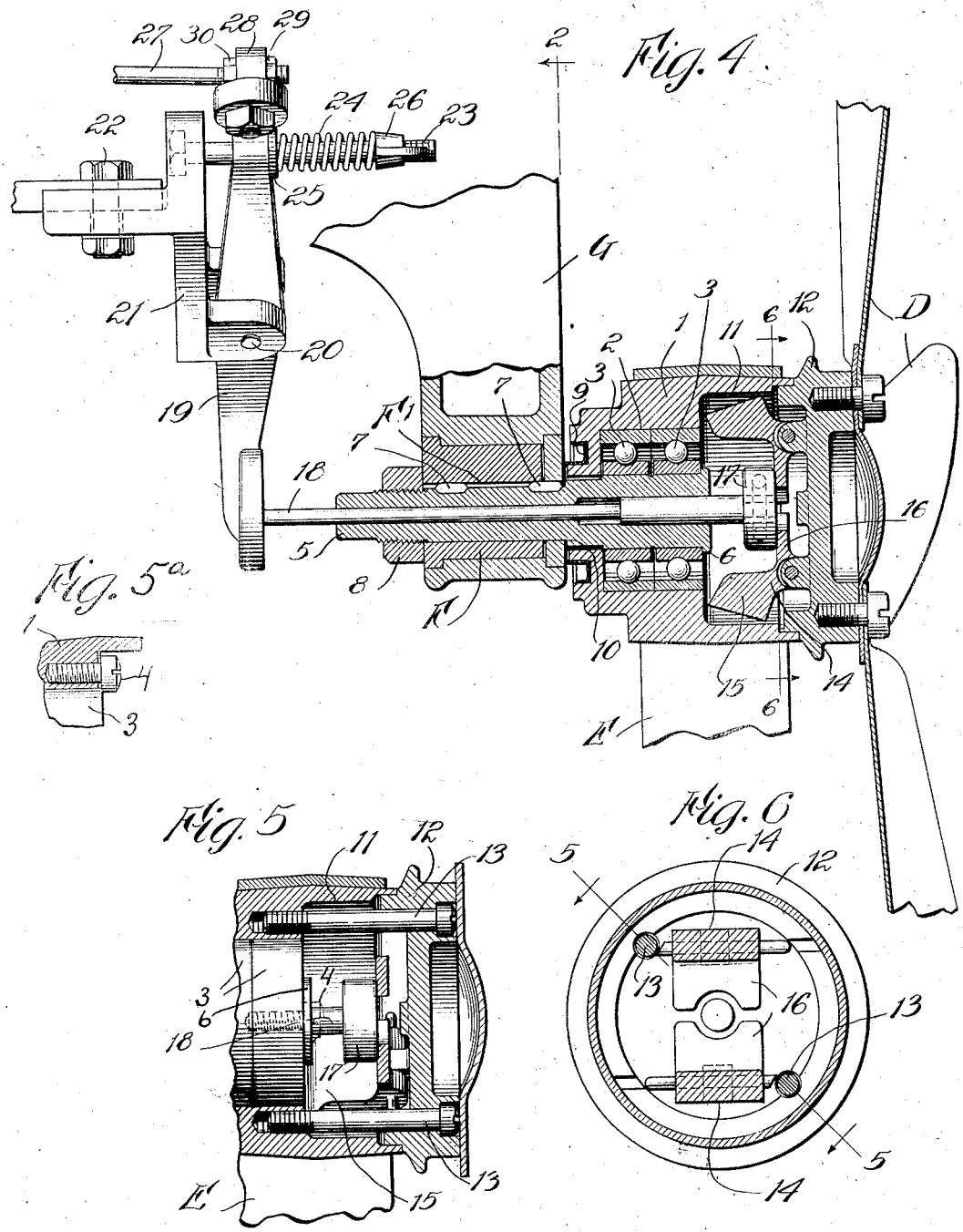

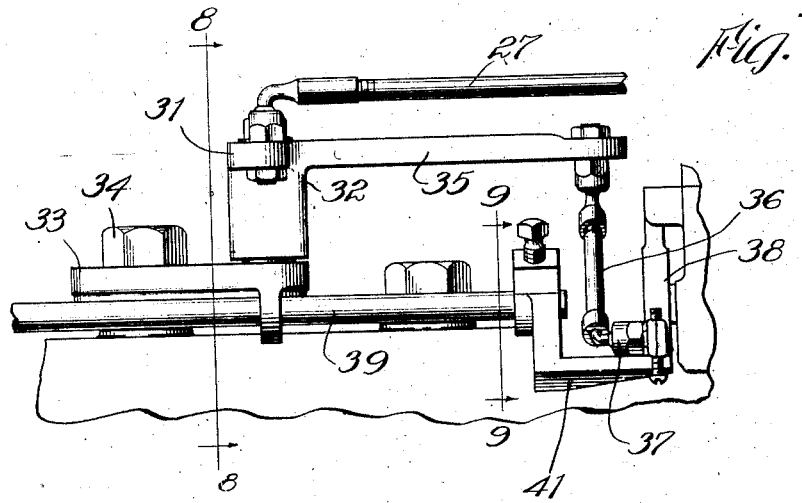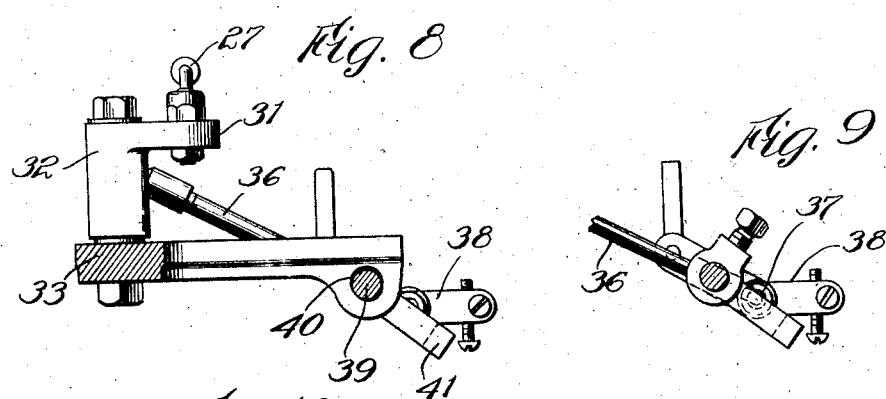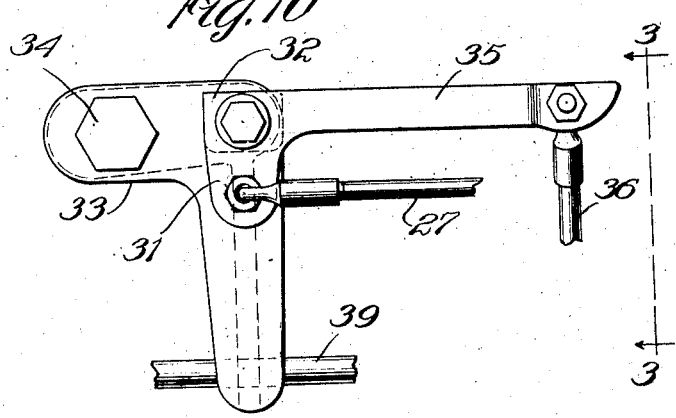

Patented Oct. 27, 1925.

1,558,791

UNITED STATES PATENT OFFICE.

RAY F. CHENEY, OF ROCKFORD, ILLINOIS, ASSIGNOR OF ONE-THIRD TO WILLIAM H. WILLIAMSON AND ONE-THIRD TO CARROLL H. STARR, BOTH OF ROCKFORD, ILLINOIS.

GOVERNOR.

Application filed October 17, 1921. Serial No. 508,253.

*To all whom it may concern:*

Be it known that I, RAY F. CHENEY, a citizen of the United States, residing at Rockford, in the county of Winnebago and State of Illinois, have invented certain new and useful Improvements in Governors, of which the following is a specification.

It is desirable that tractors be provided with governors in order that the speed may be maintained constant notwithstanding variations in load such as occur, for example, in ascending and descending grades.

The particular object of the present invention is to provide a governor of such character that it may be manufactured as an attachment for tractors which are not initially provided with governors, the construction being such that the governor may be conveniently and quickly applied to existing tractors.

Figure 1:
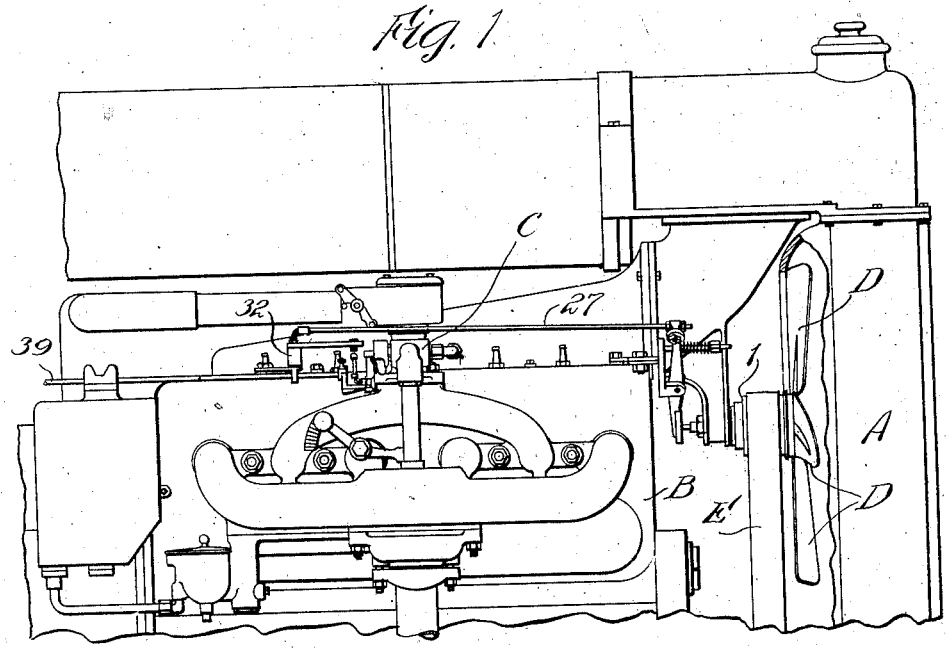
Figure 2:
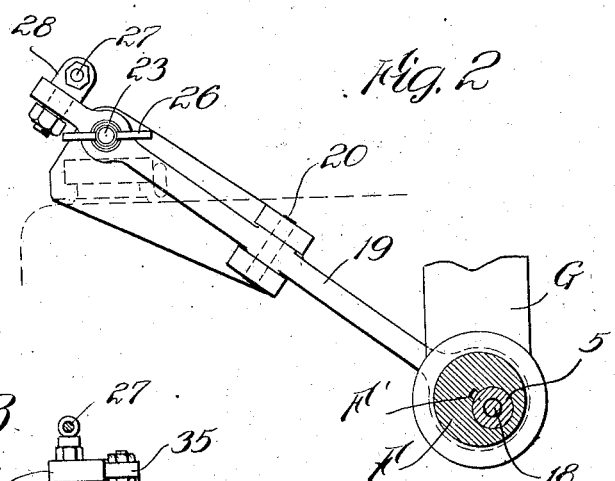
Figure 3:
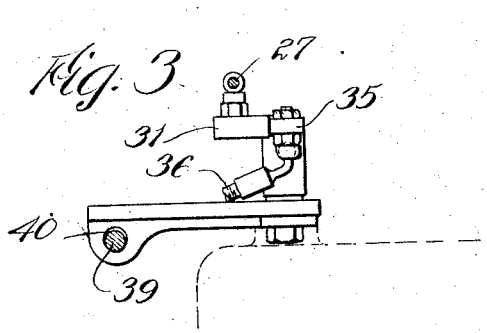

In the accompanying drawings, Fig. 1 is a fragmental side elevation of a tractor to which a governor embodying my invention has been applied. Fig. 2 is a view taken approximately in the plane of line 2—2 of Fig. 4. Fig. 3 is a view taken in the plane of line 3—3 of Fig. 10. Fig. 4 is a longitudinal central sectional view of the governor, proper, showing also some of the devices acted upon by the governor. Fig. 5 is a view taken in the plane of line 5—5 of Fig. 6. Fig. 5ª is a sectional detail view to show the means for holding the ball bearings in place. Fig. 6 is a section on line 6—6 of Fig. 4. Fig. 7 is a view showing some of the connections to the butterfly valve. Fig. 8 is a view taken in the plane of line 8—8 of Fig. 7. Fig. 9 is a view on line 9—9 of Fig. 7. Fig. 10 is a fragmental plan view of the parts shown in Fig. 7.

The drawings show the present invention as applied to the well known Fordson tractor, A being the radiator, B the engine and C the carburetor. D are the fan blades. In a Fordson tractor, the fan blades D are attached to a pulley which is driven by a belt E. I replace the pulley regularly furnished with the tractor with a special pulley of the same outward dimensions and adapted to have the fan blades D applied thereto. This special pulley is designated in the drawings as 1. As shown in Fig. 4, the pulley 1 has an annular chamber 2 adapted to contain two ball bearings 3. These ball bearings are secured within the chamber 2 by means of two screws 4. The ball bearings 3 are mounted upon a spindle 5 having at its forward end an annular shoulder 6 to prevent displacement of the pulley in that direction. The spindle 5 is mounted in an eccentric bushing F supported in a bracket G fixed to the motor framework. (See Figs. 2 and 4.) In said bushing is a keyway F' which receives keys 7 on the spindle 5. The spindle is secured with the bushing F rigidly in the bracket G, by means of a nut 8 threaded on the spindle 5. 9 is a dust guard engaging the pulley 1, the nut 8 serving to clamp the dust guard between the bracket G and a shoulder 10 on the spindle.

The bearings 3 are sufficiently spaced apart and so located with reference to the transverse center of the pulley as to support the pulley properly against the belt pressure.

In the forward portion of the pulley 1 is a chamber 11 communicating with the chamber 2 and adapted to contain the governor, proper. The forward side of the chamber 11 is closed by a cap 12 to which the fan blades D may be secured, the cap being held in place by screws 13 (Fig. 5). Upon the inner side of the cap 12 are pivotally mounted two bell crank levers 14 each comprising a weighted arm 15 and an arm 16. The arms 16 extend toward each other and bear against a thrust bearing or head 17 (Fig. 4) upon the forward end of a push pin 18. The latter extends slidably and rotatably through an axial opening in the spindle 5. The rear end of the push pin 18 bears against the pallet end of the lower arm of a lever 19 which is pivoted at 20 in a bracket 21, said bracket being secured to the motor framework by means including a bolt 22. It is apparent that although the spindle 5 may assume different positions with respect to the lever 19 by virtue of adjustments of the bushing F, as may be made from time to time to take up slack in the belt E in an obvious manner, the push pin 18 will in any event engage the pallet on the lever 19, the latter being made large enough for this purpose. In the upper arm of the lever 19 is an opening through which a stem or bolt 23 extends freely. The head of said stem is non-circular and lies within a corresponding shaped recess in the bracket 21 whereby the stem is held against rotation. A coiled expansive spring 24 surrounds the stem 23 and bears at one end against the lever 19 through the medium of a washer 25 and at its other end against a wing nut 26 threaded on the forward end of the stem 23. The spring 24 acts to hold the thrust bearing or head 17 pressed against the arms 16 at all times.

The connections between the lever 19 and the butterfly valve may be of any suitable character. Herein is shown a rod or link 27, one end portion of which extends through a block 28 which is pivoted to the upper arm of the lever 19. An adjusting nut 29 and a lock nut 30 are threaded on the forward end of the rod 27 on opposite sides of the block 28. The rear end of the link 27 has a ball and socket connection with the short arm 31 of a bell crank lever 32, said bell crank lever being pivotally supported upon an angular bracket 33. The bracket 33 is adapted to be secured to the engine B by means of a cap screw 34. The long arm 35 of the bell crank lever 32 has a ball and socket connection with a link 36. The latter is connected at 37 to an arm 38 on the shaft or pivot of the butterfly or throttle valve of the carburetor C.

In operation, when the engine speed increases because of a decrease in load the weighted arms 15 of the governor move outwardly, thereby pushing the pin 18 rearwardly against the pressure of the spring 24. The motion thus imparted to the lever 19 is transmitted to the butterfly valve through the linkage hereinbefore described, whereby the valve is moved to decrease the supply of combustible mixture to the engine.

When the load is increased, the tendency of the tractor to slow down causes the governor to open the throttle valve sufficiently to maintain the desired speed.

Being enclosed in the pulley 1, the governor is well protected against mechanical injury and dust. Sufficient lubricant may be placed in the chamber 11 when the pulley is assembled to ensure proper lubrication of the ball bearings 3 and the governor for a long time. By locating the governor and the ball bearings within the pulley, I am enabled to apply a governor to the Fordson tractor, notwithstanding the limited space between the radiator and the pulley-supporting bracket G.

It will be understood that the spring 24 may be adjusted to cause the governor to maintain any desired speed.

A rock shaft 39 extends forward from a point within convenient reach of the operator, the forward portion of said shaft being loosely supported in an opening 40 (Fig. 8) in the bracket 33. To the front end of the shaft 39 is fixed an angular finger 41 (Fig. 7) that underlies the arm 38.

I claim as my invention:

A governor device comprising a hollow fan pulley, a cap fitting the front end of the pulley, fan blades attached to the front of the cap, a hollow bearing spindle projecting into the rear end of the pulley, governor arms mounted on the inner side of the cap and enclosed within the space between the front end of the spindle and the cap, and an operating connection extending from the governor arms thru the spindle.

In testimony whereof, I have hereunto set my hand.

RAY F. CHENEY.